June 22, 1948.  R. A. BUERSCHAPER  2,443,891
ELECTROPNEUMATIC TACHOMETER
Filed April 19, 1947  2 Sheets-Sheet 1

INVENTOR.
ROBERT A. BUERSCHAPER
BY D. Clyde Jones
ATTORNEY

June 22, 1948. R. A. BUERSCHAPER 2,443,891
ELECTROPNEUMATIC TACHOMETER
Filed April 19, 1947 2 Sheets-Sheet 2

*INVENTOR.*
ROBERT A. BUERSCHAPER
BY
D. Clyde Jones
ATTORNEY

Patented June 22, 1948

2,443,891

UNITED STATES PATENT OFFICE 2,443,891

ELECTROPNEUMATIC TACHOMETER

Robert A. Buerschaper, Rochester, N. Y., assignor to Taylor Instrument Companies, Rochester, N. Y., a corporation of New York Application April 19, 1947, Serial No. 742,653

2 Claims. (Cl. 177—351)

1

This invention relates to an electro-pneumatic instrument of the force balance type which can be utilized in indicating, recording and/or controlling changes in a given variable.

In accordance with this invention, an electrical response to a change in a variable condition is translated into a corresponding relative movement of a pneumatic couple which in turn pneumatically operates an index to indicate the magnitude of the electrical response.

The invention will best be understood from the detailed description and claims when taken with the drawings in which:

Figure 1:
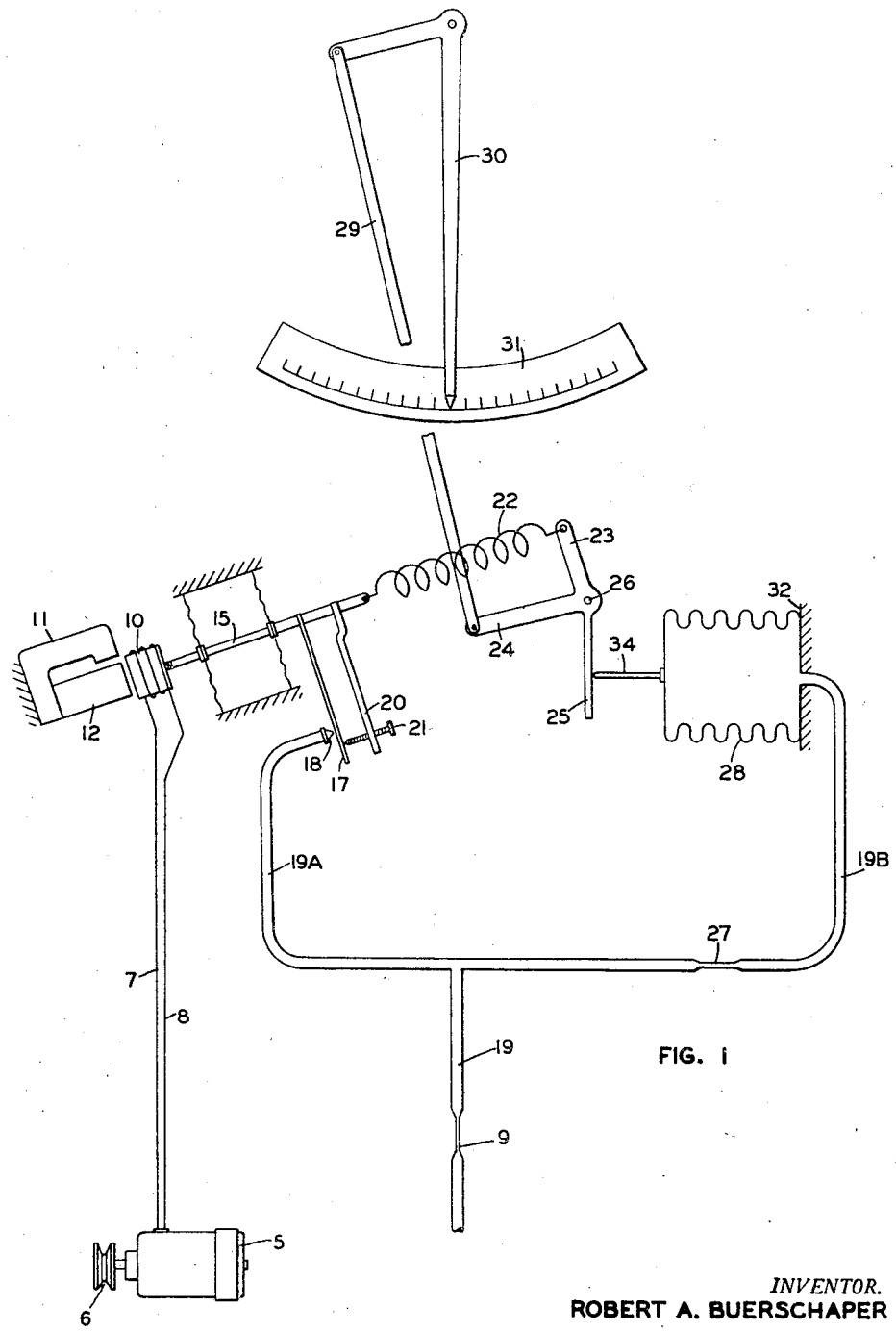
Fig. 1 is a diagrammatic showing of instrument of the present invention.

In the system of this invention, there is provided an electrical sensing unit which develops a voltage proportional to changes in a variable condition under consideration. By way of example the electrical sensing unit is herein illustrated as an electrical tachometer 5 (Fig. 1) provided with a pulley 6 adapted to be driven from a shaft (not shown), the speed of which shaft changes with changes in the load thereon. The output of the tachometer is connected by the conductors 7 and 8 to the movable coil 10 of an electrical driver suitably fastened to a wall of the case C. This driver comprises a cylindrical ferromagnetic housing 11 closed at one end and having a coaxial opening therein at its other end. There is attached to the inner surface of the closed end of the housing, a coaxial permanent magnet 12 which carries at its free end a polepiece 13. This pole-piece generally fills the opening in the end of the housing except for a narrow annular gap across which the flux from the magnet travels. The movable coil 10 is wound on an insulating cup-shaped form 14 of such size and shape that its rim is movable axially in the mentioned gap, depending on the reaction resulting from the mentioned flux and the lines of force caused by the flow of current in the coil. As herein illustrated, the outer end of the form is closed so that a threaded rod 15 can be fixed thereto to project coaxially from the form and act as a support therefor. The rod 15 which carries the form 14 with its coil 10, is mounted for axial movement thereof being supported at the centers of the spaced flexible diaphragms

2 as spring-like supports, to project beyond the same. These diaphragms are supported at their margins in spaced parallel relation to each other and to the closed end of the form, in a central opening in a paramagnetic cap 16. This cap fits over the open end of the housing and also serves to protect the parts therein. The intermediate part of the projecting end of the rod 15 has adjustably secured thereto, a flat flexible baffle 17 which projects at right angles from the rod into operative relation with a nozzle 18 mounted on the cap. The baffle and the nozzle constitute a pneumatic control couple, since compressed air supplied at uniform pressure through pipes 19 and 19a to the nozzle, escapes therethrough under the throttling action of the baffle. The flexible baffle 17 is conveniently adjusted with respect to the nozzle 18 by an arm 20 which is secured to the rod 15 so that it projects in parallel relation to the baffle. A screw 21 threaded in the free end of the arm can be manually adjusted to force the free end of the baffle 17 nearer to or farther from nozzle 18 as desired, for calibration purposes.

Figure 2:
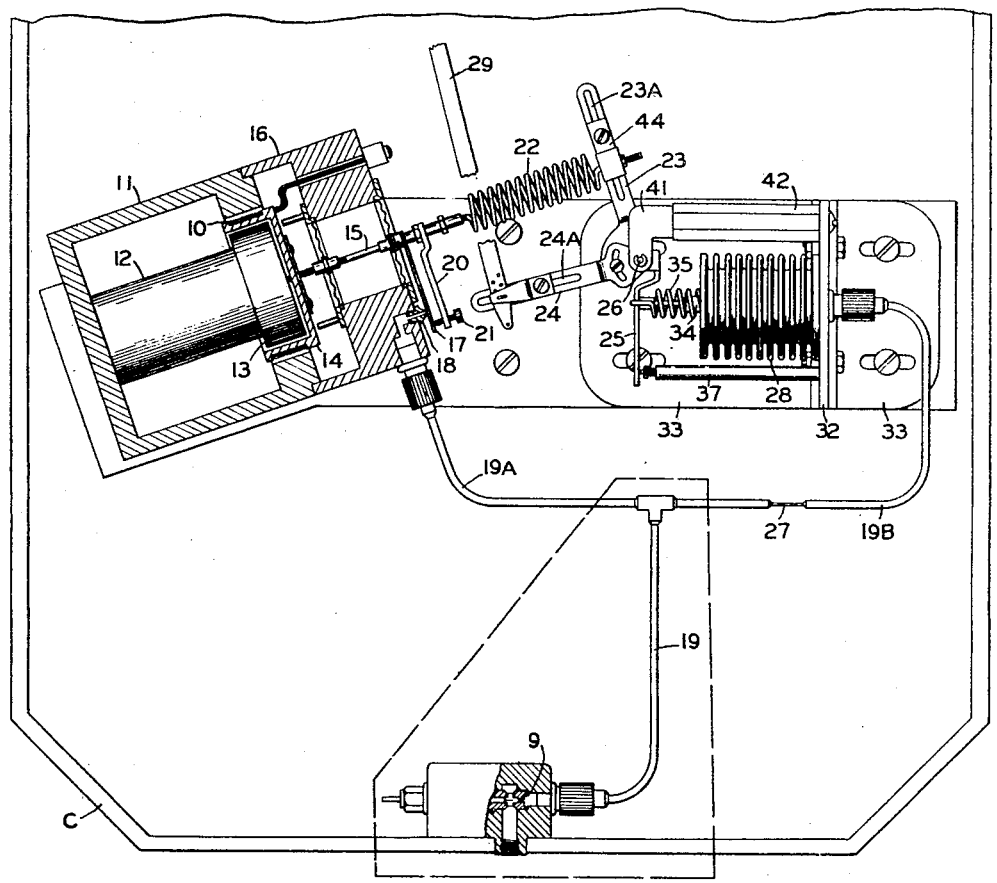
Fig. 2 is a front view of the actual mechanical structure of the present instrument with certain of the parts thereof broken away for clearness of description.
Figure 3:
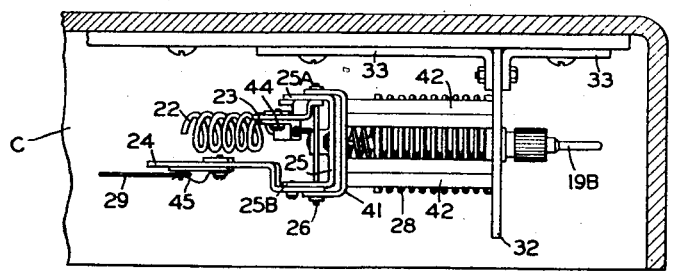
Fig. 3 is a fragmentary top view of a portion of the instrument disclosed in Fig. 2.

The free end of the rod 15 has connected thereto one end of a coiled spring 22, the other end of the spring being connected to the arm 23 of a bell crank lever. This lever which is also provided with the arms 24 and 25, is pivoted at 26. The arm 25 of this lever is actuated by a unit including bellows 28, while the arm 24 operating through the link 29 swings the pivoted index or pointer 30 with reference to a graduated scale 31. The bellows 28 has its right end fixed on a mounting plate 32 which in turn is adjustably supported on the rear wall of the case by means of brackets 33 (Fig. 3). The left or movable end of the bellows 28 is provided with a lug 34 in a position normally in contact with the arm 25 (Fig. 1). The interior of the bellows communicates through pipe 19b and restriction 27, with pipe 19a. Thus the back pressure at the nozzle 18 causes the bellows 28 to expand or contract as the case may be and reacts back on the baffle 17 through coil spring 22 until the forces applied to the respective ends of rod 15 which carries the baffle, are balanced. In practice, as shown in Figs. 2 and 3, a spring 35 having its ends respectively connected to the arm 25 and to the lug 34, tends to hold these parts in contact. However, this spring functions as an over-travel arrangement so that when, the bellows 28 contracts until the arm 25 engages the stop 37, any further contraction of the bellows will cause the lug 33 to move out of contact with the mentioned arm. On the other hand, when the bellows expands again, the lug 34 will contact the lever arm 25, moving it away from the stop 37.

In the diagrammatic illustration of the instrument in Fig. 1, the arms 23, 24 and 25 of the bell crank lever have been shown integral, but for convenience in manufacture and calibration these parts are preferably constructed as illustrated in Figs. 2 and 3. In this construction, the upper end of the arm 25 has an integral bracket formed at right angles thereto, the bracket comprising ears 25a and 25b with opposed openings therein. These openings receive the pivot 26 on which the arm 23 can rotate. The pivot 26 is supported in a channel-shaped bracket 41 which is carried on the pillars 42 projecting from the mounting plate 32. The arm 24 which effects the movement of the index 30, is mounted on the ear 25a for angular adjustment with respect to arm 25. Similarly, the arm 23 which reacts through spring 22 on the baffle 17, is mounted for angular adjustment on the ear 25b. As illustrated, the arms 23 and 24 are provided with longitudinal slots 23a and 24a respectively in which connectors 44 and 45 are adjustable to change the effective lengths of these arms.

In operation, the tachometer 5 will be driven by the pulley 6 in accordance with the speed to be measured. Let it be assumed this speed increases. The tachometer then develops a voltage proportional to this increased speed thereby causing a corresponding current to flow through conductors 7 and 8 as well as through coil 10. The reaction between the lines of force around the current carrying conductors of the coil 10 and the magnetic flux passing across the annular air gap of the driver, develops a certain force which moves the coil with its supporting form 14 a slight distance into the gap. As the coil and form are thus actuated, the rod 15 and the baffle 17 are moved according to the mentioned force causing the baffle to approach the nozzle 18 in a throttling movement. As the baffle approaches the nozzle, the resulting increased back pressure in pipe 19a is communicated through restriction 27 and pipe 19b to the interior of bellows 28. Bellows 28 expands in response to this increased pressure, thereby moving its lug 34 outward against the arm 25 of the bell crank lever to rotate this lever in a clockwise direction. This clockwise movement causes the arm 24 to operate link 29 which in turn advances the index 30 over the scale 31 to indicate the change in speed. This movement also causes the arm 23 to elongate the coil spring 22 with a resultant force on the rod 15 tending to separate the baffle 17 from the nozzle 18. This separation of the baffle and nozzle continues until the force exerted on the baffle as a result of the action of the spring 22 and bellows 28 is balanced by the force exerted on the baffle as a result of the action of the electrical coil in the driver unit as a result of the electrical response to the original change. A decrease in speed will operate the mechanism in a similar manner but in the opposite sense. Under certain conditions it may be desirable to introduce a pilot or relay valve between the nozzle 18 and the bellows 28. When this becomes desirable, the portion of the instrument illustrated within the broken line enclose of Fig. 2 thereof will be omitted and the relay valve of Fig. 1 of the Edwards Patent 2,299,884, granted October 27, 1942, will be substituted therefor. When such a substitution is made pipe 25 will communicate with pipe 19a leading to nozzle 18 of the present Fig. 2 and pipe 36 of the patent will communicate with pipe 19b of this application. Supply pipe 25 of the patent replaces pipe 19 of the present disclosure.

While the instrument of this invention has been disclosed as indicating changes in speed, it will be understood that this device can be used to indicate changes in any variable which is capable of causing an electrical response corresponding to each change.

What I claim is:

1. In an indicating device, a pneumatic couple comprising a baffle and a nozzle having fluid under uniform pressure supplied thereto, a driver unit, means electrically responsive to a deviation in a given condition for applying to said driver unit an electric current corresponding to said deviation whereby it develops a primary force proportional to said deviation, means including said driver for applying said force to said baffle to effect a movement of said baffle in one sense with respect to said nozzle, a pressure operated motor movable in response to the back pressure at the nozzle, a bell-crank lever having one arm movable proportionally to the movement of said bellows, means including a spring interposed between said bell-crank lever and said baffle whereby said motor reacts back through said spring to apply a secondary force to said baffle in the opposite sense from said first force, which secondary force balances said primary force, and means including an index movable by said bell-crank lever for indicating the amount of said deviation.

2. In an indicating device, a pneumatic couple comprising a baffle and a nozzle having fluid under uniform pressure supplied thereto, a driver unit, means electrically responsive to a deviation in a given condition for applying to said driver unit an electric current corresponding to said deviation whereby it develops a primary force proportional to said deviation, means including said driver for applying said force to said baffle to effect a movement of said baffle in one sense with respect to said nozzle, a pressure operated motor movable in response to the back pressure at the nozzle, means including a spring interposed between said motor and said couple whereby said motor reacts back through said spring to apply a secondary force to said couple in the opposite sense from said first force, which secondary force balances said primary force, and means including an index movable by said motor for indicating the amount of said deviation.

ROBERT A. BUERSCHAPER.

REFERENCES CITED

The following references are of record in the file of this patent:

UNITED STATES PATENTS

| Number | Name | Date |
|---|---|---|
| 1,695,471 | Roucka | Dec. 18, 1928 |
| 2,195,351 | Ziebolz | Mar. 26, 1940 |
| 2,427,235 | Smoot | Sept. 9, 1947 |